April 18, 1933.  A. G. RAYBURN  1,904,011
POWER TRANSMISSION
Filed April 11, 1928  8 Sheets-Sheet 1
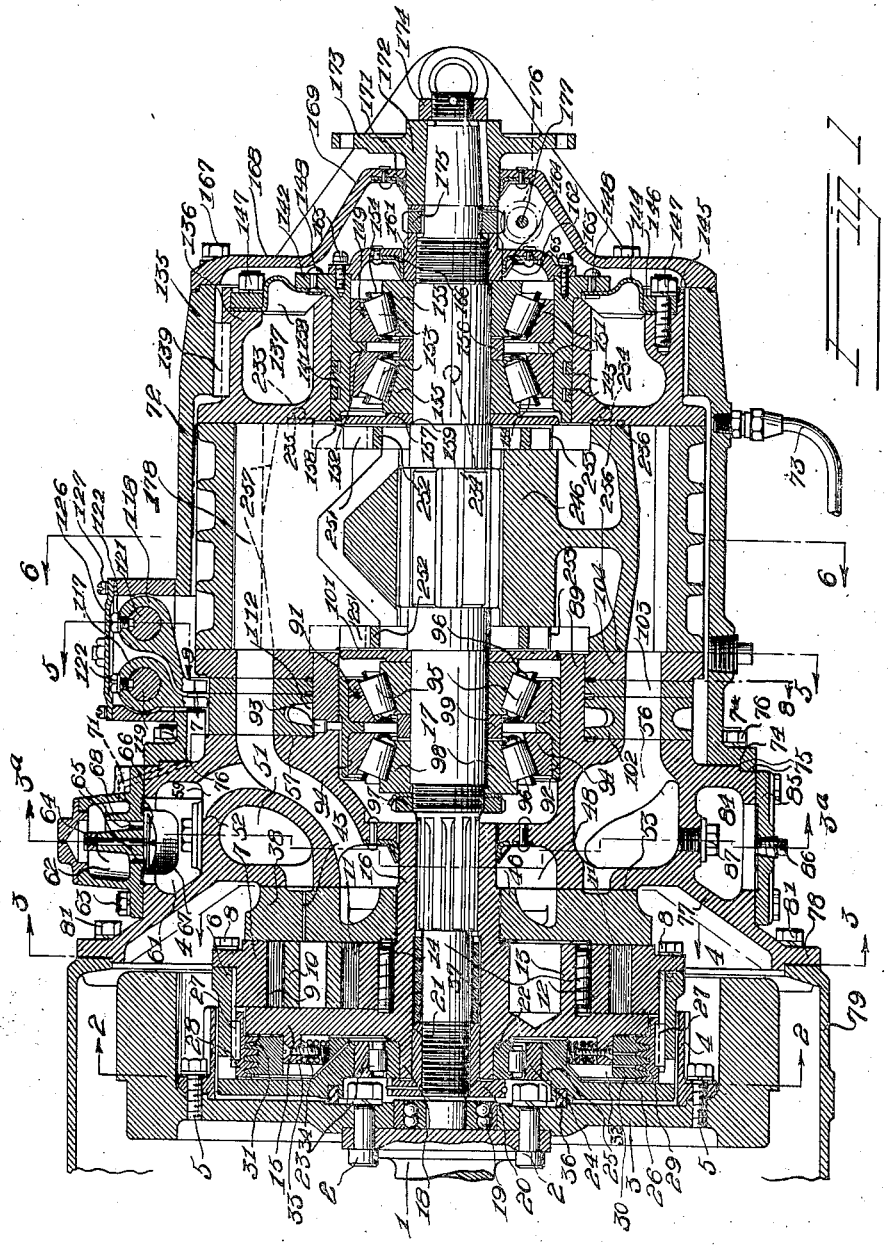
INVENTOR.
Alden G. Rayburn
BY William A. Strauch
ATTORNEY

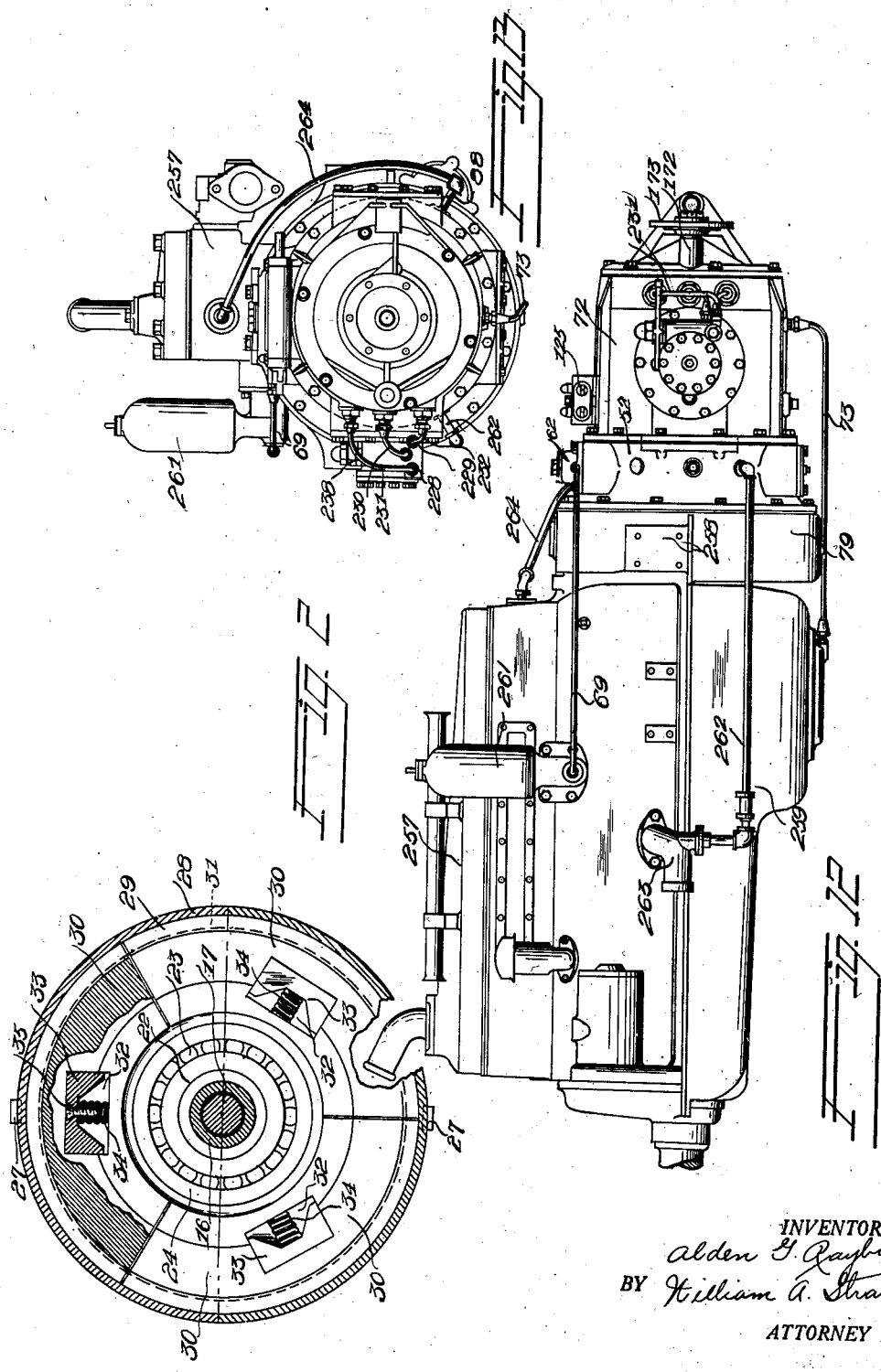

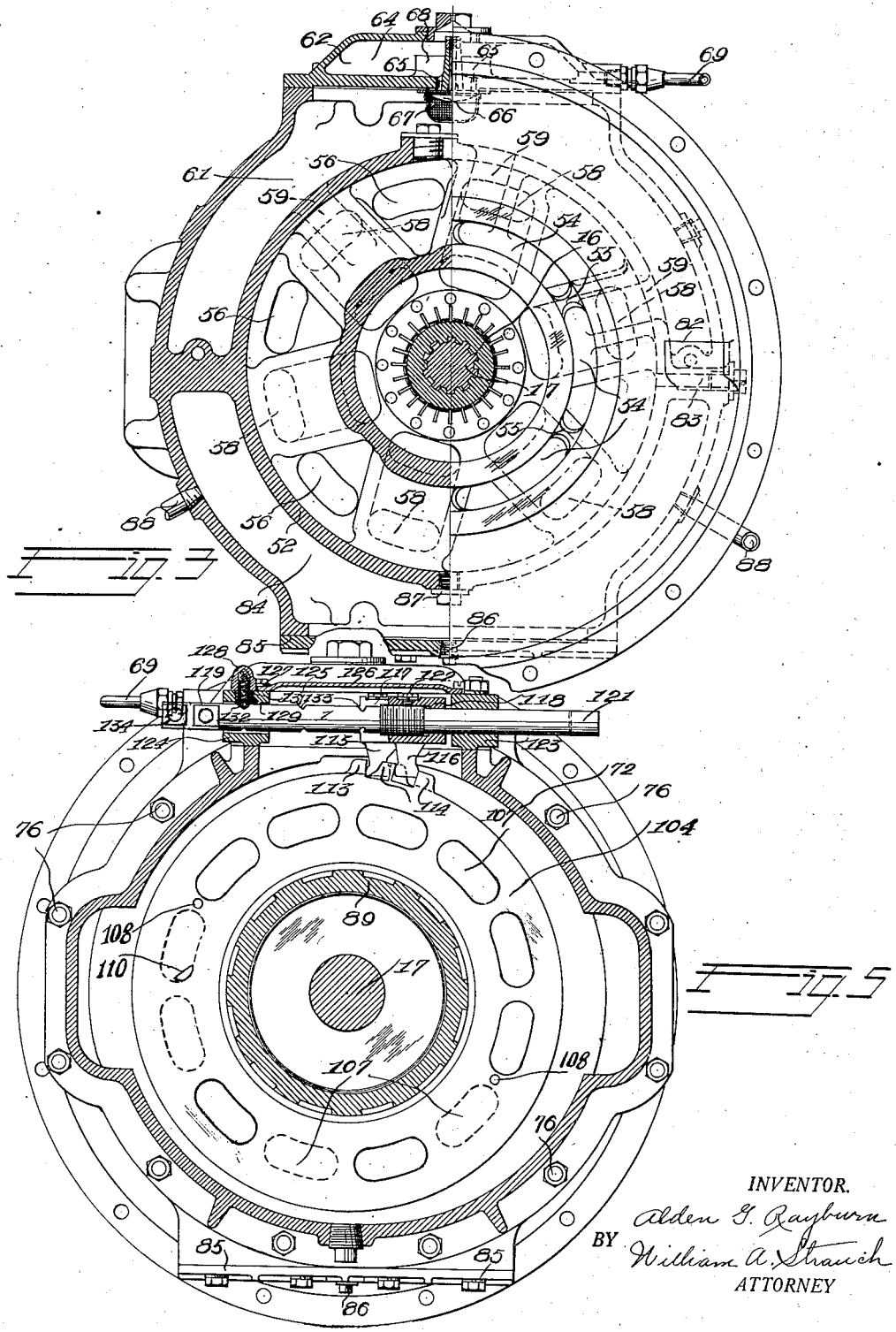

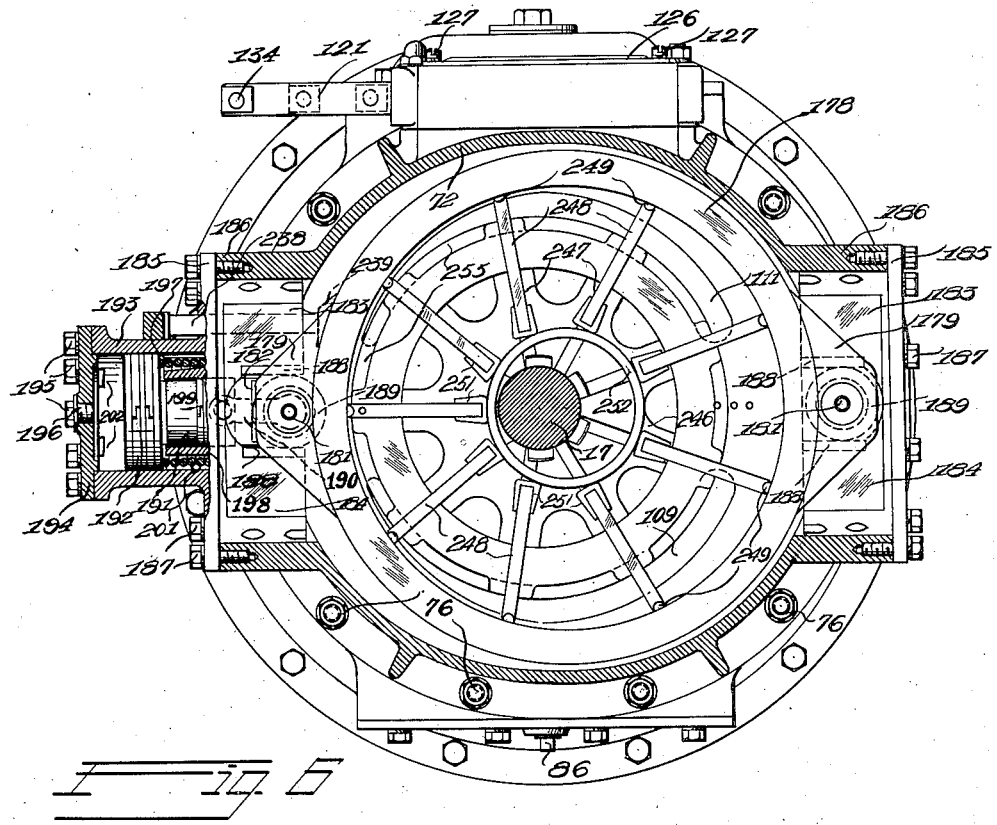

April 18, 1933. A. G. RAYBURN 1,904,011
POWER TRANSMISSION
Filed April 11, 1928 8 Sheets-Sheet 5
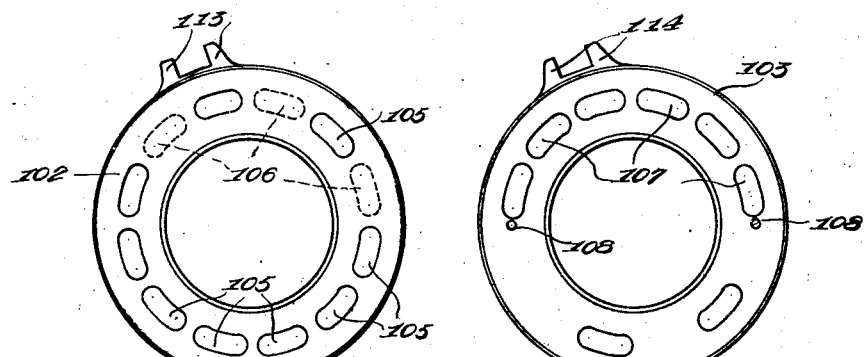
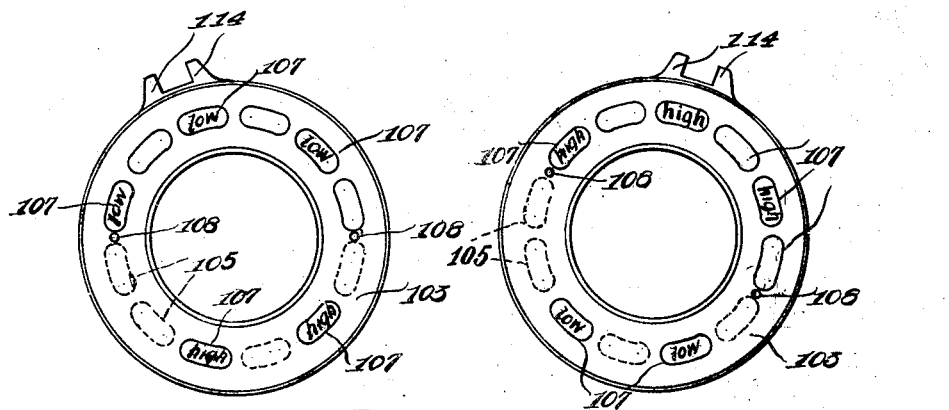
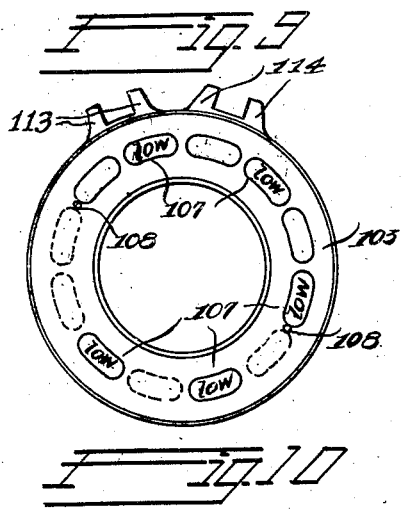
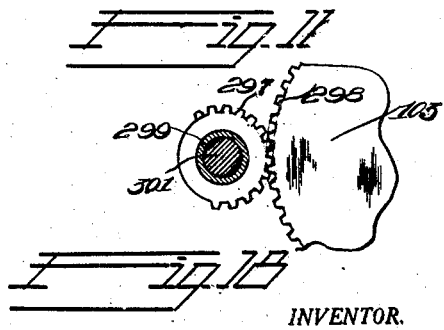
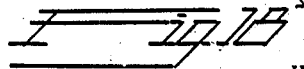
INVENTOR.
Alden G. Rayburn
BY William A. Strauch
ATTORNEY

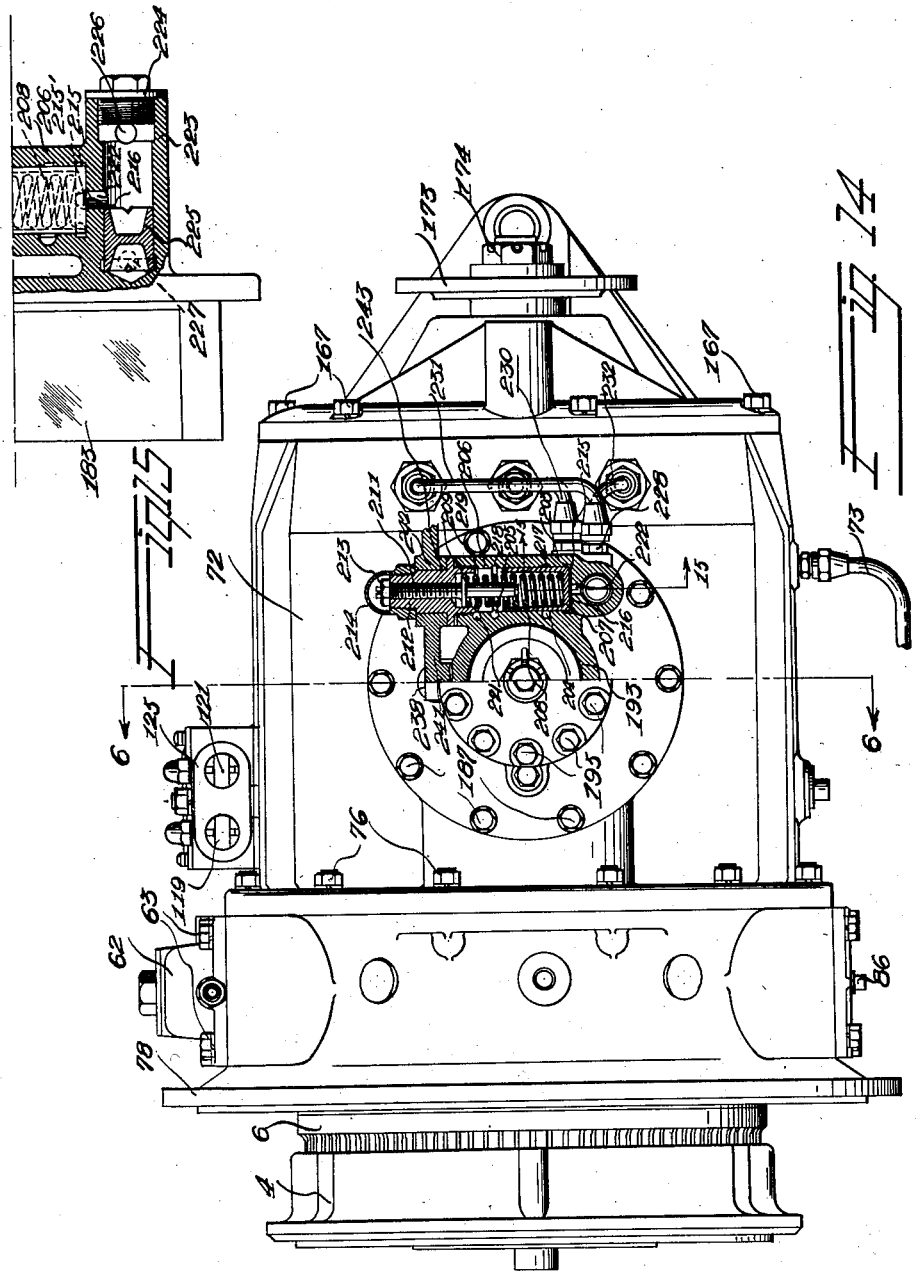

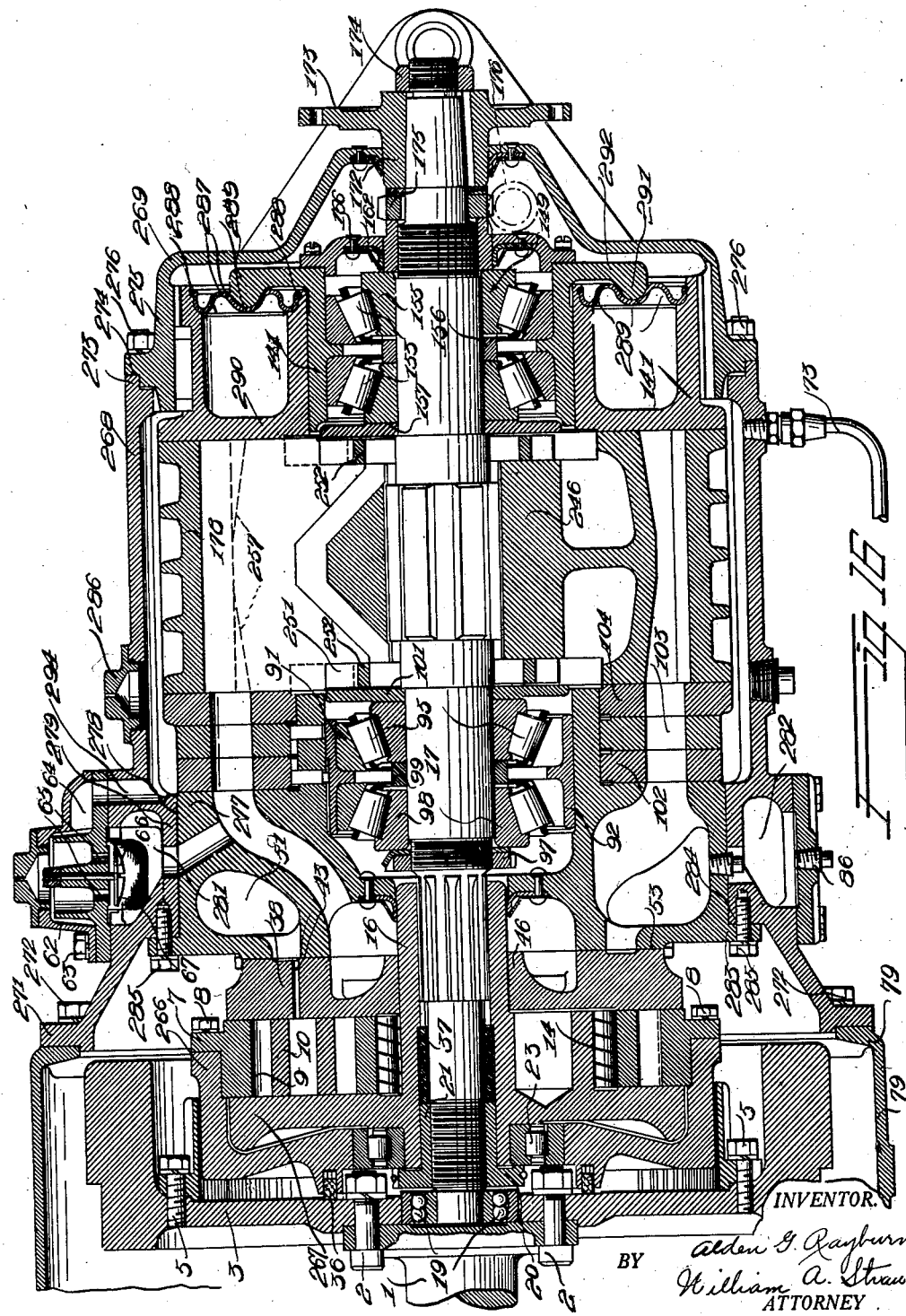

April 18, 1933. A. G. RAYBURN 1,904,011
POWER TRANSMISSION
Filed April 11, 1928   8 Sheets-Sheet 8
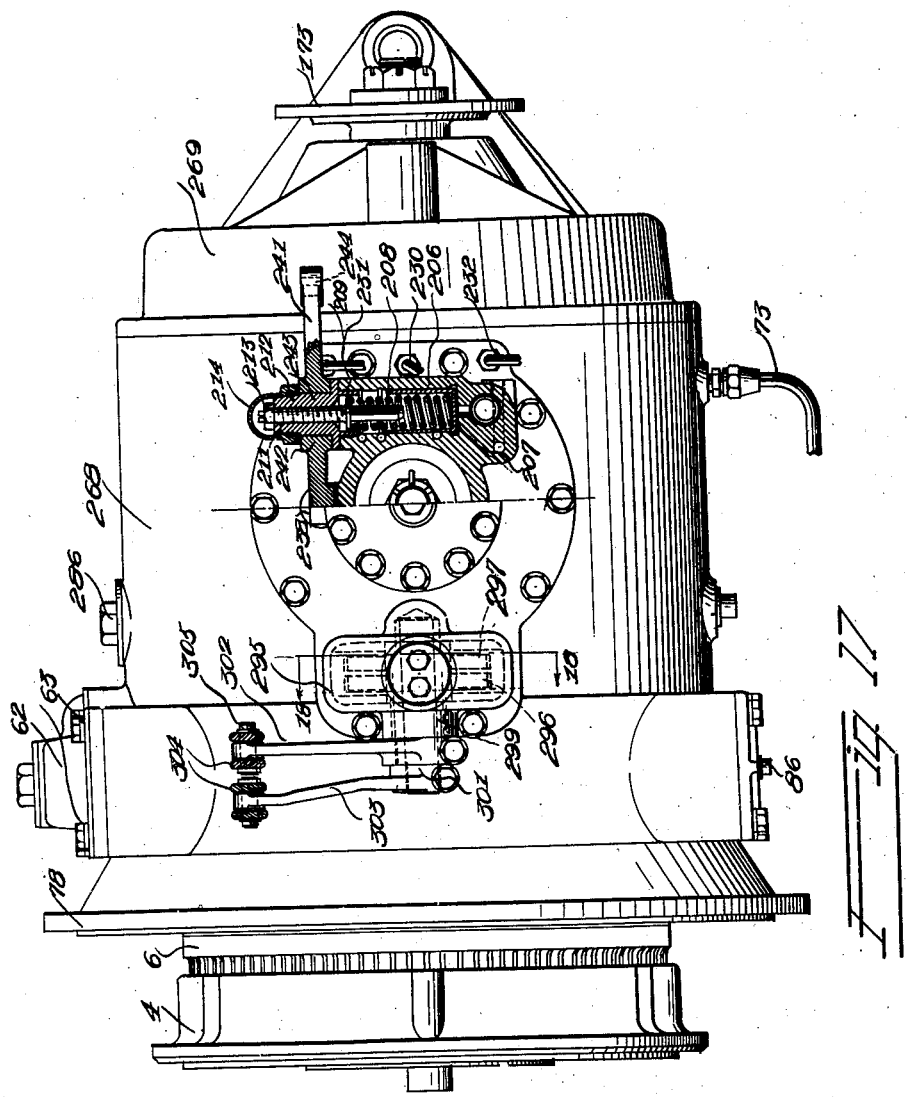
INVENTOR.
Alden G. Rayburn
BY William A. Strauch
ATTORNEY Patented Apr. 18, 1933

1,904,011

UNITED STATES PATENT OFFICE

ALDEN G. RAYBURN, OF SAUSALITO, CALIFORNIA, ASSIGNOR, BY MESNE ASSIGNMENTS, TO AUTOMOTIVE ENGINEERING CORPORATION, A CORPORATION OF DELAWARE

POWER TRANSMISSION

Application filed April 11, 1928. Serial No. 269,135.

The present invention relates to power transmitting apparatus and more particularly to hydraulic torque multiplying power transmissions.

The preferred forms of inventions hereinafter disclosed are of the type of transmission in which the maximum pumping occurs with maximum torque multiplication, and in which the fluid comes to rest when the mechanism is in direct couple or the driving and driven members are rotating substantally at the same speed. In the development of the preferred forms of the invention special types of pump, motors, bearings and control arrangements, have been devised the principles of which are applicable in various relations independent of those hereinafter set forth, and it is to be understood that the use of such features in other relations is contemplated as within the scope of the present invention.

In hydraulic transmissions heretofore developed the most common form utilized are piston pumps and piston motors. Pumps and motors of the piston type, however, produce rapid reciprocations of the operating fluid. At the higher speeds, the fluid cannot follow the pump pistons so that failure of the pump to pick up fluid at higher speeds and agitation of the fluid causing foaming or emulsification occurs resulting in failure of operation at the higher speeds. The piston pump and motor types of hydraulic transmission accordingly are inherently limited to relatively low speed operation, and are generally not satisfactory for the transmission of power at more than approximately five or six hundred revolutions per minute.

To permit higher speed operation than has heretofore been feasible with the piston type pump and motor transmission, various forms of rotary pumps and motor mechanisms and combinations of rotary pumps with piston motors have been proposed most of which are impractical. I have heretofore devised transmissions involving combinations of rotary gear pumps with piston motors in which the fluid passes continuously in a single direction through the pump, eliminating the reciprocation of fluid in the pump. Because of the large bearings required in the reciprocating piston motors for this type of transmission and the driving reactions developed in order to multiply the torque satisfactorily the maximum safe operating speed for this type of transmission has been approximately 1500 revolutions per minute. The bearing cost and cost of construction are prohibitive for utilization of this type of transmission in usual automobile practice.

To meet the requirements of a transmission for use with modern high speed automobile engines, speeds in excess of 2500 revolutions per minute must be safely transmitted, while the cost of the construction must compare favorably with the cost of the comparatively low priced gear transmissions at present in use in automobiles. I have devised novel mechanisms utilizing both rotary pumps and rotary motors, of special construction to meet the severe requirements of high speed automotive transmissions at comparatively low cost.

Accordingly a primary object of the present invention is to provide novel hydraulic transmissions of comparatively simple, rugged and low-cost construction, adapted for use with modern internal combustion automobile engines.

Another object of the invention is to provide novel and efficient rotary type pumps and motors adapted for high speed operation, and particularly adapted for use in hydraulic transmissions, but the principles of which are applicable in various other relations.

Still another object of the present invention is to provide hydraulic transmissions embodying novel automatic and manual control mechanisms.

A further object of the invention is to provide a novel variable capacity motor construction, together with automatic controls therefor, useful particularly in hydraulic transmissions, but the principles of which are applicable to variable capacity pumps and in other relations.

Still a further object of the invention is the provision of a novel rotary pump construction having means for holding the pump parts in fluid sealing engagement, while permitting variations due to temperature changes of the parts without binding, especially designed for hydraulic transmissions, but useful in independent relations.

A still further object of the present invention is the provision of novel means for progressively relieving the fluid pressure within hydraulic mechanism as the speed of rotation of the tail or driven shaft thereof increases and whereby upon reaching a predetermined speed the tail or driven shaft is driven directly by the prime movers.

Other objects of the invention are such as may be attained by a utilization of the various combinations, sub-combinations and principles hereinafter set forth in the varied relations to which they are obviously applicable by those skilled in the art, and as defined by the terms of the appended claims.

As shown in the drawings—

Figure 1 is a vertical sectional view through a preferred form of hydraulic transmission embodying my invention.

Figure 2 is a transverse sectional view taken along line 2—2 of Figure 1, and partly broken away.

Figure 3 is a transverse sectional view, the right half being taken along line 3—3 of Figure 1, and the left half being taken along 3ª—3ª of Figure 1.

Figure 4 is a transverse sectional view taken along the line 4—4 of Figure 1.

Figure 5 is a transverse sectional view taken along the line 5—5 of Figure 1.

Figure 6 is a view taken along line 6—6 of Figures 1 and 14.

Figure 7 is a view taken along line 7—7 of Figure 1 showing the clutch and reverse valve construction.

Figure 8 is a view taken along line 8—8 of Figure 1 showing the lock off and reverse co-operating valve construction.

Figure 9 is a detailed view taken along line 8—8 of Figure 1 showing the relative position of the valve parts for forward automatic operation.

Figure 10 is a detailed view taken along line 8—8 of Figure 1 showing the position of the valve parts in direct drive position.

Figure 11 is a detailed view taken along line 8—8 of Figure 1, showing the relative position of valve parts for reverse operation.

Figure 12 is a side elevation showing the preferred arrangement of the invention in combination with an internal combustion engine for use in an automobile.

Figure 13 is a rear elevation of the structure shown in Figure 12.

Figure 14 is a side elevation of the hydraulic transmission showing the automatic control valve and pistons in half section.

Figure 15 is a section taken on line 15—15 of Figure 14 showing the pressure direction valve.

Figure 16 is a view similar to Figure 1 depicting certain modifications.

Figure 17 is a side elevational view of the construction shown in Figure 16 with parts broken away and in sections, and Figure 18 is a partial sectional view taken on line 18—18 of Figure 17.

As shown in Figure 1, connected to a shaft 1 of a suitable prime mover, such for example, as a gasoline or internal combustion engine, by means of the securing bolts 2, is a flywheel 3 to which the end flange of a cylindrical drive member 4 is secured by means of the studs 5. Formed in the drive member 4 are internal series of driving teeth or splines which mesh with the teeth or splines of cylindrical pump ring gear supporting member 6 to which pump ring gear 7 is secured by means of cap screws 8. Gear 7 is provided with internal gear teeth 9, the inner surfaces of which are adapted to rotate in fluid sealing engagement with the outer surface of sealing segment 10 and which mesh with teeth 11 of a pump pinion 12 opposite the center of segment 10. The tops or outer surfaces of pinion teeth 11 are adapted to rotate in fluid sealing engagement past the inner surface of sealing segment 10. Pinion 12 is rotatably journalled on eccentric 13 by means of roller bearings 14 which eccentric is formed integrally with the pump side wall member 15. The roller bearing engaging surfaces of pinion 12 and eccentric 13 are hardened for cooperation with the hardened roller bearings 14. A central tubular driving quill section 16 is formed integrally with pump side wall member 15, the end of which is slidably splined to the driven or tail shaft section 17 and a relatively short integral tubular section 18 extends from member 15 oppositely to quill section 16. Tail shaft 17 at its forward end is slidably journalled in pilot bearing 19, the outer race of which is supported and secured in flywheel 3. Threaded on the end of shaft 17 is a nut 20 provided with a cylindrical pilot extension 21 fitting slidably into a central bore formed in quill 16. As shown in Figure 1, nut 20 bears against and retains the inner race 22 of roller bearing assembly 23 on section 18 in engagement with wall member 15, the outer race 24 of which supports the inner portion 25 of outer wall 26 of supporting member 6. Secured to the inner periphery of member 6 by means of suitable keys 27 is a two part cylindrical member 28, one edge of which projects over the outer periphery of member 15 as shown in Figure 1 and which is provided with a plurality of circumferential frictional clutch ribs 29 projecting inwardly between member 15 and wall 26.

Disposed for limited sliding movement within member 28 and between member 15 and wall 26 is a plurality of clutch sectors 30 which as shown in Figure 2 are combined to form a substantially complete circular member but have their ends slightly spaced apart to allow for individual movement thereof relative to member 28. Each member 30 is provided with clutch ribs 31 for cooperation with ribs 29 and is further provided with a rectangular guide and limiting aperture 32 into each of which projects a driving extension 33 from member 15.

Disposed in each aperture 32 is a helical spring 34 one end of which engages the bottom of the aperture and the other end of which engages the bottom of extension 33 being held in position by means of screws 35 projecting from extension 33 within the springs. As clearly shown in Figure 2, springs 34 normally urge members 30 inwardly with clutch ribs 29 and 31 out of clutching engagement. A suitable packing ring 36 seats in a channel in wall 26 and engages the adjacent face of fly wheel 3 to retain fluid that may be packed into the bearings 19 and 23 or may accumulate due to leakage in operation of the mechanism. Surrounding shaft 17 and interposed between the end of the tubular extension 21 of nut 20 and the ends of splines formed in the end of quill 16 is a helical compression spring 37 normally under compression to force the quill 16 together with the pump side wall 15 to the right in Figure 1 with relation to shaft 17. Slidably keyed on quill 16 is a pump end wall and fluid distributing plate 38 against the inner surface of which gear 7, sealing segment 10, and pinion 12 abut. Sealing segment 10 is disposed between member 15 and distributing plate 38 and is maintained in position by means of suitable supporting and aligning screws extending through member 15, into plate 38 and through holes 39 in opposite ends of segment 10 between which holes segment 10 is longitudinally split providing relatively narrow slits 41 terminating in holes 39 and an intermediate substantially wider slit 42 adapted to receive fluid through small opening 43 the pressure of which expands the segment 10 into fluid sealing engagement with gear teeth 9 and 11 as will more fully hereinafter appear.

Formed in the left face (Figure 1) of member 38 is high pressure or outlet port 44 shown by the broken lines in Figure 4 which connects with the irregular shaped distributing port 45 also shown in broken lines in Figure 4 and formed in the timing face 46 (Figure 1) of the plate 38. A fluid inlet or suction port 47 formed in the left face (Figure 1) of plate 38 is connected with central annular fluid storage space 48 through passage 49. An annular storage space 51 is formed centrally in a fluid receiving and storing casting 52 around quill 16 (Figure 1) which is provided with a distributing face 53 contacting with the distributing face 46 of plate 38.

Formed in the timing face 53 of member 52 and extending through the member 52 is an annular series of high pressure fluid ports 54 (Figure 3) separated by the strengthening ribs 55 forming a substantially 360 degree inlet passage to annular high pressure fluid storage chamber 51 (Figure 1) of casting 52. Communicating with high pressure fluid chamber 51 is a series of high pressure outlet ports 56 (Figures 1 and 3) which terminate in face 57 of casting 52. Ports 56 are spaced equally around the face 57 and alternate with low pressure ports 58 which terminate in face 57 and communicate with the central low pressure fluid storage chamber 48. The upper ports or passages 58 are connected by a plurality of fluid inlet passages 59 to fluid storage reservoir space 61 formed in the top of casting 52. Casting 52 is provided with a cover 62 for the chamber 61 which is secured in position by the cap screws 63. Formed in cover 62 is a fluid inlet and overflow chamber 64 connected by the openings 65 in its lower wall to chamber 61. Slidably supported in a suitable control boss formed in the lower wall of cover 62 is the stem of a poppet valve 66, which under sudden surges of fluid and pressure closes openings 65 and shuts off communication between the chamber 61 and chamber 64. A suitable filter screen 67 secured on the bottom of cover 62 prevents the entry of foreign material with the fluid from chamber 64 into the chamber 61 and filters the operating fluid returned to reservoir space 48. Formed in chamber 64 is an overflow wall 68 determining the level to which the fluid may rise in chamber 64, due to fluid pumped into the chamber 64 through the fluid inlet connection 69 (Figure 3) from a suitable circulating pump such for example as the oil pump by pass connection of the prime mover. The wall 68 forms a discharge compartment for the overflow fluid by discharging the latter through the overflow duct 71 to the rear transmission casing section 72 the bottom of which is drained through the return pipe connection 73 (Figure 1) to the engine crank case or to the suction side of the circulating pump. The overflow fluid assists in the lubrication of the motor. Casing section 72 is provided with a securing flange 74 (Figure 1) having locating surfaces 75 which fit against and are adapted to engage suitable complemental locating surfaces formed on casting 52, which serve to accurately locate the casing section 72 with relation to casting 52, the casing section 72 being secured to casting 52 by securing bolts or studs 76 (Figure 5). Casting 52 in turn has formed integrally therewith the supporting casing section 77 which is provided with the securing and locating flange 78 secured to the engine bell housing or fly-wheel casing 79 by means of securing studs or bolts 81 (Figure 1).

Formed integrally with the casting 52 and casing section 77 are a pair of diametrically opposite fluid catch pockets 82 (Figure 3) each open at its top and draining into a passage 83 extending between its bottom and the interior of casing section 72 by way of a side portion of the casting 52.

To provide for control of the temperature of the operating fluid in operation of the mechanism, a water chamber or space 84 is provided in casting 52 extending from the passages 83 around the bottom of casting 52 which is provided with a bottom cover plate 85 secured in position by suitable cap screws. Cover plate 85 is provided with a drain plug 86 and when removed gives access to plug 87 for draining the high pressure fluid chamber 51. Water or cooling fluid may be circulated through space 84 by means of pipe connections 88. When the mechanism is utilized with an internal combustion engine water from the cooling jacket of the engine is preferably circulated through space 84 before being passed to the cooling radiator and in this way temperature of the operating fluid may be held at a value conducive to efficient operation.

Formed integrally with casting 52 is a tubular extension 89 (Figure 1), in a central bore of which a roller bearing assembly indicated generally by the numeral 91 is mounted. The bearing assembly 91 comprises a cage 92 slidably mounted in the central bore formed in the extension 89 of casting 52 which is held against rotation by a key member or pin 93 supported in and extending through extension 89, the inner end of which fits slidably into a key-way cut into cage 92. Secured in the cage 92 are the outer bearing races 94 which support annular series of conical rollers 95 which are held in position by retaining and spacing rings 96. Supported within rollers 95 and secured on tail shaft 17 by means of securing nut 97 are the inner conical bearing races 98 which are separated by the spacing ring and shim 99. As shown in Figure 1 inner races 98 are maintained between nut 97 and a disk 101 which abuts against a shoulder of tail shaft 17. Disk 101 is slightly smaller in diameter than the central bore in extension 89 and in operation rotates with shaft 17 throwing fluid out by centrifugal force thus preventing surges of fluid from storage space 51 past bearing 91 as well as acting as a guide for the motor rings hereinafter described.

Supported slidably and rotatably on the periphery of tubular extension 89 is the clutch control and reversing valve plate 102 and the lock-off and cooperating reverse valve plate 103; also slidably keyed on the end of extension 89 is the motor side wall and distributing plate 104. As shown in Figures 1 and 7, formed in the clutch plate 102 is a plurality of through ports 105 and a plurality of ports 106 extending partially through plate 102. Ports or passages 105 and 106 are arranged to register with the ports 56 and 58 of the casting 52 to permit circulation of the fluid for power transmission, and to interconnect the ports 56 and 58 to establish a by-pass of fluid independently of the motor when a neutral position is desired to be established and as will more fully hereinafter appear.

Formed in the lock-off and reverse cooperating control plate 103 are the ports or fluid passages 107 so shaped and spaced as to register with ports 105 of valve plate 102 and to align with ports 56 and 58 of casting 52 for control purposes. Relief holes 108 formed in plate 103 are positioned to prevent locking of the motor housing due to formation of fluid pockets. This is accomplished by the valve plate 102 being shifted to neutral or declutching position thereby bringing the holes 108 in register with the low pressure, and are blanked off when the valve parts are in position for power transmitting operation of the mechanism as will more fully hereinafter appear. Formed in motor end wall plate 104 are elongated fluid ports 109 and 111 (Figure 6) through which fluid from ports 107 of plate 103 is circulated through the motor. As will be noted from Figure 1 plate 102 is relatively thick as compared with plate 103 and is provided with a lightening inner annular recess 112.

Plate 102 and 103 are provided with projecting lugs 113 and 114 respectively which are engaged by the operating ends 115 and 116 (Figure 5) of the valve operating blocks 117 and 118 adjustably threaded on operating rods 119 and 121 and locked thereon by set screws 122. Rods 119 and 121 are slidably mounted in end bearings 123 and 124 of a housing 125 secured to and opening into casing section 72, the housing provided with a cover 126 secured in position by bolts 127. Bearing 124 has threaded thereinto the reduced threaded ends of a pair of cap members 128, one in alinement with each rod 119, 121 and slidably mounted in the bore of each cap member 128 is an outwardly opening thimble 129 between the bottom of cap member 128 is disposed a compression helical spring 131 which outer end of bore in cap member 128 is disposed a compression helical spring 131 which yieldably forces thimbles 129 inwardly with tapered inner ends 132 thereof in engagement with any desired ones of a plurality of U-shaped notches 133 in rods 119 and 121 to hold them in any adjusted position. The outer ends of rods 119 and 121 are flattened and apertured as at 134 for connection with any suitable form of actuating mechanism. By reciprocating rods 119 and 121 in various positions, it will be seen that the relative angular position of the plates 102 and 103 with respect to each other and with respect to casting 52 and motor end wall plate 104 may be varied to vary the alignment of the fluid ports. Any suitable type of control mechanism may be utilized for actuating the rods 119 and 121 to control the positions of the valve plates as will be apparent to those skilled in the art.

Formed integrally with the casing section 72 (Figure 1) is a thickened end portion 135 provided with a cylindrical bore of less diameter than that of the chamber defined by section 72 and in which is slidably supported, a motor end wall casting 136 provided with an annular fluid pressure chamber 137 which opens through the outer face of casting 136 as indicated at 138. The outer periphery of casting 136 is slidably keyed to portion 135 as at 139. Supported slidably in a central bore of casting 136 is a tubular section 141 of a bearing cage which is provided with an outwardly extending flange 142 at the outer end thereof. Packing rings 143 are nested in grooves in section 141 and engage casting 136 to prevent fluid leakage. A flexible diaphragm 144 closing chamber 137, has the outer edge thereof seated in a recess 145 in casting 136 being held in place by a ring 146 and screws 147. The inner edge of diaphragm 144 rests against the inner face of flange 142 and is secured thereto by rivets 148 extending through flange 142. Disposed between section 141 and shaft 17 is a combined radial and thrust roller bearing assembly 149 comprising outer conical races 151 disposed on opposite sides of a spacing rib 152 carried by section 141 and which are pressed into position in central bores formed in section 141.

Races 151 support an annular series of conical rollers 153 held in position by retaining rings 154. Rollers 153 support the conical races 155 which are separated by the shim and spacing ring 156 and held in position on tail shaft 17 against a disk 157 the outer periphery of which is slightly spaced from a recess 158 in member 141 and abuts against a shoulder 159 on tail shaft 17 by the threaded securing collar 161. Secured in position against the outer end of cylindrical member 141 is a cap 162 which is held in position by means of cap screws 163. The periphery of collar 161 extends through a central opening in cap 162 and a packing leather 164 is secured between a retaining member 165 and cap 162 by means of the rivets 166. Leather 164 is held in fluid sealing position against the cylindrical surface of collar 161 by means of spring fingers formed on retaining member 165 by suitable slots. Secured to the end of casing section 72 by means of the cap screws 167 is an end cap 168 provided with an extension 169 encasing the collar 161 and which is provided with packing leather 171 to prevent loss of fluid around the hub 172 of the drive member 173 which is splined on the end of shaft 17 and secured thereon by a nut 174 threadedly engaged with the end of shaft 17.

Secured to shaft 17 between hub 172 and collar 161 is a driving gear 175 which meshes with and drives the gear 176. Gear 176 drives a shaft 177 journaled in and extending through the end cap or housing member 168. Shaft 177 may be utilized to drive a speedometer for a motor vehicle, or may be used to drive a circulating oil pump for the transmission mechanism to return fluid from connection 73 (Figure 12) of casing section 72 to the connection 69 (Figure 3) of cap 62, after passing through a suitable filter when the circulating pump of an internal combustion engine is not used for this purpose.

Disposed between motor end walls 104 and 136 is a ring like motor housing 178. As shown in Figure 6, motor housing 178 is provided at its opposite sides with pairs of laterally spaced supporting projections or ears 179. Secured in suitable bores formed in ears 179 are the roller supporting pins 181 which extend through slots 182 in castings 183 provided with opposite flat faces 184 and attaching flanges 185 secured to cylindrical extensions 186 of casing section 72 by means of studs 187. The opposite flat faces of castings 183 are provided with hardened bearing plates 188 arranged between ears 179 and flat faces of castings 183 for engagement with spaced rollers 189 carried by pins 181 thus preventing rotation of motor housing 178 but permitting it to shift with minimum friction laterally of casing section 72 to eccentric positions relative thereto.

The mid-section of one of the pins 181 is pivotally connected between its supporting rollers to one end of a link 190, the opposite end of which connects it to one end of piston rod 191 of an automatic control mechanism (Figures 6, 14 and 15) which regulates the volumetric capacity of the motor in accordance with operation of the device. Piston rod 191 is provided with a reduced end section on which the differential piston 192 is suitably secured or integrally formed. Piston 192 is mounted for reciprocation in a control cylinder 193 which is preferably formed integrally with flange 185. Cylinder 193 is provided with a removable head 194 which is held in position by the securing studs or cap screws 195 and provided with a plug 196 threaded into the center thereof. Piston 192 with its connected parts is normally urged toward the left in Figure 6 by a helical compression spring 197 interposed between cylinder 193 and a tubular projection 198 in which rod 191 reciprocates and has fluid tight engagement therewith through a ring 199 seated in a groove in the rod for engagement with inner wall of projection 198.

Actuating fluid for piston 192 is admitted to cylinder 193 through ports 201 and 202 which are connected by the passages or ducts 203 and 204 and 205 respectively to the interior of control cylinder 206 (Figs. 14 and 15). Mounted in cylinder 206 is a piston valve 207 which is provided with an internal bore in which one end of valve spring 208 is seated. The other end of valve spring 208 abuts against a collar 209 of the compression adjusting member 211 adjustably threaded into the end plug 212 of cylinder 206. A lock nut 213 threaded on the protruding end of member 211 locks the member 211 in adjusted position and a cap 214 threaded on plug 212 encases the adjusting member 211 and nut 213. Formed in the inner end of cylinder 206 is an annular fluid distributing duct or groove 215 which communicates with the passage 203 and through which fluid is admitted to the cylinder 193. Cut into and across the end of valve 207 is a fluid distributing groove 216, the ends of which are in communication with groove 215 in the position of parts shown. Formed in the walls of cylinder 206 are grooves 217 and 218 which communicate with the passages 204, 205, and an annular groove 219 which communicates with exhaust passage or duct 221. The passage or duct 221 terminates in an opening in the inner face of the flange 185 establishing communication between the outlet end of cylinder 206 and the interior of casing section 72. Communicating with groove 215 is a port 215'.

Fluid under pressure is admitted through the groove 216 to the interior of cylinder 206 through passage 222 (Figures 14 and 15) from a control valve cylinder 223 one end of which is closed by threaded plug 224. Mounted for reciprocation in the interior of cylinder 223 is a control valve member 225, the position of which determines whether communication is established between fluid passages 226 and 227 and passage 222. Passages 226 and 227 as shown in Figures 13 and 14, terminate in threaded pipe connections 228 and 229 and threaded into pipe connections 228 and 229 are fluid supply pipes 231 and 232. Pipes 231 and 232 as shown in Figure 1 are connected by suitable pipe connections to passages 233 and 234 formed in the motor end wall of casting 136 and a pipe 230 connects port 215' with a port 234' formed in casting 136 establishing communication with pressure chamber 137. Passages 233 and 234 communicate with slots 235 and 236 cut into the inner face of the motor end wall, so that in operation of the mechanism, fluid pressures will be supplied through passage 235 or 236 and pipe 231 or 232 to the interior of cylinder 223 through passage 226 or 227 depending upon the direction of rotation of the motor.

In operation of the automatic control mechanism so far described with pressures cut off from the motor by operation of the cut off valve plate as will more fully hereinafter appear, no fluid pressures will be built up in either of the supply pipes 231 or 232. Under such conditions valve 207 will be held in the position shown in Figure 14 by its spring 208 and passage 202 of cylinder 193 will be in communication through interior of cylinder 206 and passages 205 and 221 with the interior of casing section 72, and piston 192 will be forced to the left in Figure 6 under the influence of spring 197, moving motor housing 178 to the position of minimum or substantially zero eccentricity and volumetric capacity of the motor. The passage 221 is located at a point higher than the fluid level in the control cylinder 193, thereby keeping sufficient fluid for satisfactory operation present at all times. With the motor functioning for torque multiplication, fluid pressures will be built up in slot 235 or 236 depending whether the motor is running forward or in reverse direction, and fluid under pressure will be forced from the slot 235 or 236 into pipe 231 or 232, as the case may be. This fluid will be admitted into cylinder 223 through port 226 or 227 shifting the valve 225 towards the low pressure side of the cylinder 223. At the same time fluid under pressure is admitted through port 215', pipe 230 and port 234' to the chamber 137 placing the fluid in chamber 137 under a pressure that forces diaphragm 144 together with bearing cage 141, the bearings carried thereby, and shaft 17 to the right in Figure 1, while casting 136 is forced to the left, holding the parts in assembled relation as will more fully hereinafter appear.

Since the port 222 is open, fluid under pressure will pass therethrough into the groove 216 of valve 207 into passage 203, port 201, and into the interior of cylinder 193 aiding spring 197 to hold the piston 192 to the left in Figure 6 until the pressures developed exceed a predetermined amount. When the resistance to rotation of the tail shaft 17 is such that sufficiently high fluid pressures are developed in the high pressure side of the motor to cause yielding of spring 208, valve 207 will shift, compressing the spring 208. The initial movement of valve 207 will close the annular passage 218 and will cut off the passage 205 from the discharge passage 221 and in this position of parts, no fluid can escape from cylinder 193 through ports 201 and 202 and piston 192 together with the motor housing and related parts are hydraulically held in predetermined position. Further movement of valve 207 against the compression of spring 208 as the fluid pressure rises will cause the end of the valve 207 to pass beyond and uncover the groove 217 of cylinder 206 admitting fluid under pressure through passage 204 and the lower port 202 (Figure 6) into the opposite side of cylinder 193. It will be noted that the area of left face of piston 192 in Figure 6 is substantially greater than the area of the opposite face and the parts are so proportioned that when fluid under pressure is admitted through the passage 204 the differential pressure exerted on the piston 192 due to this difference in area is sufficient to shift the piston 192 together with motor housing 178 and the connected parts against the compression of spring 197.

As will more fully hereinafter appear, shifting of the motor housing in this manner increases the torque multiplying ratio of the mechanism so that when the load on the tail shaft 17 exceeds a predetermined value the torque multiplication is automatically increased. With a given load, as the torque multiplying ratio of the mechanism increases the fluid pressures decrease and spring 208 will restore valve 207 toward its position shown in Figure 14. The movement of piston 192 will continue to the right in Figure 6 until a balance is reached where valve 207 will seal grooves 217 and 218 locking the fluid in the left end of cylinder 193 (Figure 6) while fluid under pressure will continuously be admitted through the passage 203 and port 201 to the opposite end of the cylinder. When the balanced condition is reached it will be seen that the piston 192 is hydraulically held against movement thereby holding the volumetric capacity of the motor at the necessary value to overcome the resistance to turning of the tail shaft, with the fluid pressure predetermined by the compression of spring 208. In this way it will be seen that the position of piston 192 and motor housing 178, together with the related parts, will be determined by the fluid pressures developed and by the compression of the spring 208. It will accordingly be noted that the fluid pressures necessary to cause shifting of the piston 192 and the motor housing may be readily varied by removing cap 214 and changing the position of the compression adjusting member 211.

It will accordingly be seen that a novel combination of automatic control mechanism for the motor has been provided which when the fluid pressures are cut off from the motor, holds the motor in its position of minimum volumetric capacity, while during operation of the motor, and independently of the direction in which the motor is operating, the control mechanism functions so that when the fluid pressures in the motor exceed a predetermined value, the mechanism functions to vary the volumetric capacity of the motor. Accordingly, a novel combination of automatic control mechanism with a reversible motor has been provided which is an important feature of my invention.

To provide for the shifting of motor housing 178 manually for deceleration and braking purposes as will more fully hereinafter appear, an actuating plunger 238 is provided (Figures 6 and 13, 14 and 17) slidably mounted in a suitable bore formed in a boss formed integral with the cylinder 193 and flange 185. The inner end of plunger 238 abuts against a boss 239 formed on motor housing 178. Abutting the outer end of plunger 238 is one end of a lever 241 provided with an apertured hub portion 242 rotatably supported on a cylindrical portion 243 of plug 212. The opposite end of lever 241 is enlarged and apertured as at 244 by means of which it may be connected to a suitable operating cable or linkage.

When it is desired to shift the motor housing independently of the automatic mechanism, the fluid pressure is released by operating the clutch valve as will more fully hereinafter appear, and lever 241 is actuated to shift plunger 238 to the right in Figure 6, causing the motor housing piston 192 and the connected parts to shift to the right against the compression spring 197. By varying the position of the plunger 238 the limit of movement of housing 178 to the left in Figure 6 and the minimum volumetric capacity of the motor operating under influence of the automatic control mechanism may be manually predetermined. Also as will more fully hereinafter appear, the position of the motor housing may also be manually adjusted by operating plunger 238 while the automatic control mechanism is functioning and the clutch plate closed for running position thereby providing for braking and deceleration of a vehicle through operation of the transmission.

As shown in Figures 1 and 6 slidably keyed or splined to tail shaft 17 within the motor housing 178, is an actuating rotor 246 provided with a plurality of radial slots 247 preferably nine in number in which the actuating vanes or blades 248 are slidably mounted. Formed in the outer ends of the vanes or blades 248 are concave cylindrical grooves in which the aligning and sealing tips 249 having complemental cylindrical aligning surfaces are seated. Each of the blades or vanes 248 is recessed at the inner edge thereof to fit over the inclined bottom surfaces of slots 247 and is provided with a pair of guiding shoes 251 fitting over the vanes 248 as shown. Shoes 251 are provided with flat actuating surfaces which engage the periphery of actuating rings 252 in operation of the mechanism. Shoes 251 and rings 252 are disposed in suitably recessed sections 253 of rotor 246 so that the motor side walls may be held in fluid sealing relationship against the ends of the rotor and the outer ends of the vanes in operation as will more fully hereinafter appear. The shoes 251 by contacting with rings 252 at different points for different positions of housing 178 compensate for the eccentricity of the housing with relation to rings 252 in any operative relative position and maintain the ends of the vanes and sealing tips 249 in fluid sealing contact with the bore of housing 178 at all times.

Rotor 246 is suitably cored as indicated at 255 to lighten the construction while leaving suitable metal thickness for strength.

Formed on the ends of rotor 246 adjacent its periphery are fluid sealing faces 256 which are adapted to come into substantial fluid sealing engagement with the inner faces of the motor side wall plates 104 and 136 and to prevent substantial fluid leakage between the fluid pockets formed by the rotor and the vanes 248 in operation of the mechanism.

To provide for a maximum area for flow of fluid into the motor and at the same time to provide means for centralizing the rotor between the motor end walls 104 and 136 the periphery of the rotor is inclined inwardly as indicated at 257 in the spaces between the vanes 248 and the pressures developed on the inclined surfaces 257 it will be seen, tend to longitudinally balance the rotor between the motor side wall plates 104 and 136.

In operation of the motor, with housing 178 and the rotor concentric, vanes 248 will extend equally around the rotor 246 in which position the motor has a zero volumetric capacity, and can by its operation deliver no power. When housing 178 is shifted from its concentric position to the right in Figure 6, the movement of housing 178 will shift vanes 248 on the left of the vertical plane in Figure 6 inward, thereby forcing rings 252 with the remaining vanes 248 outward while maintaining sealing tips 249 in fluid sealing engagement with the inner surface of housing 178 and will establish an eccentric relation of the blades with respect to the rotor. With high pressure fluid delivered to the motor through port 109 and port 111 open to the low pressure side of the system, fluid will be admitted to the pockets formed between the eccentric housing 178 and the rotor, and a driving torque will be developed which rotates the rotor in the direction of rotation of driving member 4 and as the pockets come into communication with the port 111 the blades are retracted and the fluid is discharged into the low pressure side of the system. The amount of torque delivered by the motor will obviously be dependent upon the eccentricity of housing 178 and the torque delivery is at maximum when the eccentricity of the housing is maximum. To reverse the rotation of the motor, port 111 is connected to the high pressure side of the system while port 109 is connected to the low pressure side of the system and a reverse rotation with torque delivery dependent substantially upon the eccentricity occurs.

The arrangement of the motor vanes, and the spacing rings and the sealing tips are important features of my invention and it will be noted that the rings 252 function to positively shift the blades with relation to the rotor in operation of the motor, preventing the blades from sticking in the slots due to accumulation of dirt. The eccentricity of the housing and volumetric capacity of the motor may be changed by a simple shift operation of the housing which forces the vanes to assume the proper positions for effective operation with any volumetric capacity. It will also be noted that the sealing tips 249 will oscillate in their curved seats and will maintain a fluid seal over the ends of the vanes independently of the relative position of the housing, and rotor, and at the same time the side wall and port constructions are such that once the tips are assembled in position they are held and guided by the motor end walls 104 and 136 in any operating position of the motor housing 178. While my novel rotor, housing, and vane constructions have been disclosed as embodied in a motor, it will be obvious to those skilled in the art that the constructions and principles embodied are applicable to variable capacity pump constructions and other uses that are contemplated as within the scope of the present invention.

As shown in Figure 12 the hydraulic transmission assembly may be disposed adjacent the rear end of internal combustion engine 257 which may be any well known type of engine, and fly wheel casing or bell housing 79 is suitably secured to engine 257 as indicated at 258, with engine shaft 1 secured to fly wheel 3 as indicated in Figure 1. The return pipe connection 73 which at one end is connected to the bottom of casing section 72 extends to and has the other end secured in the crank case 259 of the engine, or to the suction side of a circulating pump (not shown), whereby the fluid accumulating in casing section 72 may be conducted to crank case 259 or to the suction side of a circulating pump to be returned to the transmission after filtration and rectification.

The fluid inlet connection 69 for chamber 64 is connected to the bypass line of the engine oil pump 261 whereby the fluid for the transmission is supplied to chamber 64. The cooling medium for engine 257 may be utilized in the transmission and accordingly a pipe 262 is connected with the suction side of water pump 263 and one of connections 88 in casting 52 and a second pipe 264 is connected with the other connection 88 and into the pressure side of the motor block as clearly indicated in Figures 12 and 13.

*Operation*

Having described a complete embodiment of my improved transmission the operation thereof will now be set forth. To vary the torque and speed relations of the driving member 4 and tail shaft 17, the eccentricity of motor housing 178 with relation to rotor 246, is varied either manually or automatically as above set forth in detail.

To fill the transmission initially with fluid, housing 178 and the related parts may be shifted through the manual control to an eccentric position, the filling plug in cap 62 may be removed, and fluid fed into the fluid storage space 64. The fluid passes downward through ducts 65 into the central fluid storage space 48 and fills the central space in the mechanism, lubricating bearings 91, and 149. From space 48 the fluid enters suction port 47 of the pump. After as much fluid has been filled into the circulating system as is possible in this way the prime mover is started into operation driving pump ring gear 7 which drives pinion 12 on eccentric 13 drawing fluid from passage 49 through port 47, carrying it past sealing segment 10 and forcing it under pressure outward through high pressure port 45 of valve plate 38 and as the pressures build up fluid will pass through port 215', pipe 230 and port 234' into pressure chamber 137, partly filling the chamber with fluid and leaving an air space at the top of the chamber in which air is compressed and acts as a yielding cushion. The pressure in chamber 137 yieldingly holds the motor and valve parts in fluid sealing relation against each other and casting 52, overcoming the fluid pressures tending to separate these parts. At the same time the fluid pressure in chamber 137 will force diaphragm 144 to the right in Figure 1 as a result of which pressure will be transmitted through shaft 17 and thrust bearings 149 holding the pump parts in fluid sealing relation against each other and casting 52. The fluid from port 45 will pass through the annular ports 54 in communication therewith into high pressure fluid storage space 51 of casting 52. To drive the tail shaft in a forward direction the valve parts are positioned as shown in Figure 9 with the operating end 115 in its power position and the operating block 117 in its outer position, and with the block 118 positioned to place the end 116 substantially in coincidence with end 115. In this position of valve parts, ports 107 in plate 103 marked "low" will be in communication through corresponding aligned ports 105 of plate 102 with aligned ports 58 of the casting 52 and with the fluid in the storage space 48 of the valve casting 52, ports 107 marked "high" will be in communication with the high pressure fluid storage chamber 51 of casting 52 through aligned ports 105, 107, and 56 of the valve plates 102 and 103 and casting 52, respectively, while the remaining unmarked ports 107 will be blanked off. Fluid will then be circulated through the motor and will accordingly rotate tail shaft 17 in the direction of rotation of the driving coupling 4. The longitudinal thrust on shaft 17 which is transmitted through diaphragm 144, and by fluid in chamber 137 holds the pump, motor, and valve parts in fluid sealing engagement with a predetermined pressure in excess of the total fluid pressure tending to separate the faces, while permitting expansion and contraction of the parts in operation as the temperatures vary, as well as preventing undue deflection of the side walls resisting the escape of fluid pressure.

In addition to the driving force applied to the tail shaft by the hydraulic motor, the reaction due to pumping is transmitted through eccentric 13 and quill 16 to tail shaft 17. Shaft 17 will then rotate at a speed with relation to the speed of driving member 4 that will depend upon the volumetric capacity of the motor per revolution of shaft 17 in well known manner. As shaft 17 rotates, valve or distributing member 38 will be driven thereby and the admission of fluid to and from casting 52 will be distributed to maintain rotation of shaft 17.

As the operation continues, the fluid, together with any air that may be contained in the system with the exception of that trapped in chamber 137 will be forced into chamber 48 and as the valve member 38 rotates with the tail shaft, fluid will pass from chamber 48 under the influence of centrifugal force through duct or passage 49 into port 47 while air entrained in the circulating fluid will pass upward through ducts 59 into the storage chamber 61 from which it will rise upward through the passages 65 of check valve 66 into space 64 and through a drilled hole in the filler cap to atmosphere. As the operation continues the air entrained in the fluid circulating system will be rapidly replaced by fluid and after the air has been eliminated the filling is continued until the fluid flows over wall 68 into the lubricating ducts and overflow passages 71. After the circulating system has been filled with fluid the filling plug may be replaced and the operation may be continued while the oil or fluid is fed to the circulating pump of the mechanism, or if the mechanism is connected to the oil pump and crank case of the engine, by the latter. Fluid is then pumped through pipe connection 69 into the storage space 64 and the filling of the oil into the engine crank case continued until the proper crank case oil level is maintained continuously indicating that the fluid storage chambers of the transmission have been filled with fluid and that the fluid is overflowing into the conduits 71 lubricating the motor parts and collecting in casing section 72 and passing through pipe connection 73 and pipe into the engine crank case or to the suction side of either a transmission or engine circulating pump.

It will accordingly be seen that when the mechanism is filled with fluid all of the operating parts are properly lubricated and any air entrained in the fluid during power transmitting operations will pass out of the circulating system from space 48 through a suitable air outlet hole in the filling plug without causing formation of emulsion, and the mechanism is operative for power transmitting purposes.

With the parts positioned as shown in the drawings, while the mechanism is transmitting power and with motor housing 178 concentric with the rotor 246 the volumetric capacity of the motor is zero. With the motor at zero capacity no fluid can be circulated between the pump and the motor and the pump parts are hydraulically locked together. Under these conditions the pump serves as a hydraulic clutch locking the driving member 4 to the tail shaft 17 for rotation in the same direction and at substantially the same speed, and the transmission is in direct couple.

The pressure developed on the fluid under such a condition depends upon the torque demand on the tail shaft, and the parts are preferably so proportioned and arranged that so long as the load on the tail shaft can be efficiently handled directly by the prime mover the parts will remain in direct couple. When the load on the tail shaft increases so that a greater torque demand is made thereon than can be delivered directly and with efficiency by the prime mover, the pressures developed in the pump unit increase to the point where valve 207 will be actuated causing piston 192 to shift motor housing 178 as above set forth automatically thereby increasing the volumetric capacity of the motor and its torque multiplication until a new balanced condition has been reached. In the new position of parts the speed of the tail shaft will be reduced below the speed of the driving member 4 and the torque will be multiplied to handle the increased load. As the load on the tail shaft varies the fluid pressures developed by the pump will vary, varying the position of the motor housing, and accordingly the torque multiplying ratio of the mechanism to meet the varied torque demands. As the load on the tail shaft decreases piston 192 will shift the motor housing to the left in Figure 6 decreasing the volumetric capacity of the motor and the torque multiplying ratio of the mechanism, and when the load decreases to the point where it can be efficiently handled by the prime mover in direct couple, the motor housing will be brought to its concentric position where pumping of fluid will again cease or until it abuts against the end of the manual control member 238 establishing a manually predetermined transmission ratio. In this way it will be seen that a transmission mechanism is provided in which the torque multiplying ratio may automatically be varied as the load on the tail shaft increases above a point which may be predetermined by the proportions of parts selected and by the positioning of member 238 under manual control.

To establish a direct couple condition while relieving the motor and automatic control parts from pressure for high speed operation the valve parts are shifted to the position shown in Figure 10 with operating members 115 and 116 in their outer and inner positions respectively. In this position of parts the ports 107 marked "low" will be in communication through ports 105 of plate 102 with the low pressure, fluid storage space 48 in casting 52 through aligned ports 58 while the remaining passages will be blanked off. Low pressure fluid will accordingly be admitted to the entire motor while the high pressure will be locked in space 51 of casting 52 and the pump parts, establishing a hydraulic lock condition of the pump parts.

To establish a reverse drive of tail shaft 17, the valve parts are positioned as shown in Figure 11 with the operating ends 115 and 116 both in inner position. High pressure fluid will then be admitted to the motor through ports 107 marked "high" which will be in communication with ports 56 of casting 52, while the ports 107 marked "low" will be in communication with ports 58 of casting 52 and the remaining valve ports will be blanked off. Under these conditions the circulation of fluid through the motor will cause rotation of the tail shaft 17 in an opposite direction to the direction of the driving member 4. It will, however, be noted that due to the functioning of valve 225 fluid pressures will be admitted to the automatic control mechanism as above set forth to vary the eccentricity of the motor housing and the torque ratio of the mechanism in accordance with the load on the tail shaft, or the lowest ratio may be held fixed by the manual control.

To establish a neutral condition in the mechanism so that the driving connection 4 and pump gears may be driven without driving the tail shaft, member 115 is shifted by means of suitable controls to a position midway between the position shown in Figures 9 and 11, to rotate clutch plate 103 until ports 105 and 106 of clutch plate 102 will overlap or interconnect ports 56 and 58. In this position of parts, a circulating path for the fluid will be established between fluid spaces 48 and 51 of casting 52 independently of the motor, preventing the building up of sufficient pressures by the action of the pump to produce rotation of the tail shaft 17 against a substantial resistance.

When it is desired to utilize the mechanism for rapid deceleration for braking purposes, plunger 238 is set manually to hold motor housing 178 at the minimum eccentricity which will give the desired torque ratio and braking effect. With the parts in this position, as the wheels drive the tail shaft, the motor unit will function as a pump, fluid pressures will be built up on the suction side of the system, and in the fluid storage space 48 closing check valve 66 and fluid will be forced under pressure into the pump unit causing fluid to be forced into pressure chamber 137 and causing the pump to function as a motor tending to speed the engine ahead of the tail shaft at a rate depending upon the eccentricity of housing 178. The fluid entering space 137 through port 215', pipe 230 and port 234' will force diaphragm 144 to the right in Figure 1 holding the motor and pump parts in operative fluid sealing relationship against the pressures tending to separate them. In this way it will be seen that the compression of the engine may be utilized for braking purposes. It is necessary to so proportion the chamber 48 and the through port areas 54 so that regardless of which area comes under high pressure there will not be a tendency to break the fluid sealing relationship of the pump parts or the motor parts. The diaphragm reacting areas are large enough to take care of alternate conditions.

As pump side wall member 15 is set into rotation with tail shaft 17, clutch members 30 will be forced outwardly under the action of centrifugal force and as the speed of tail shaft 17 increases above a predetermined rate clutch ribs 29 and 31 of members 28 and 30 respectively will be brought into progressively greater frictional engagement and at high speeds the frictional engagement may be made such that tail shaft 17 will be driven directly by motor shaft 1 through fly wheel 3, drive member 4, gear supporting member 6 and pump side wall member 15 thus relieving the pressure within the transmission and consequently relieving the bearings of the strains to which they are subject under very high speeds. Before the entire drive is taken by shaft 1 the frictional engagement between ribs 29 and 31 is such as to cause a part of the power from shaft 1 to be transmitted directly through member 15 to tail shaft 17 thus relieving the bearings even at moderate rates of speed.

*Modifications*

Having described one complete embodiment of my invention adapted for use as a transmission in a motor vehicle, modifications of the invention will now be set forth. In the modifications parts similar to those shown in the form heretofore described have been designated by like reference characters, and reference may be had to the description of these parts heretofore given for a full understanding thereof, reference being had only to so much of the parts common to the parts heretofore described as will be necessary for an understanding of the present invention.

In the form of invention illustrated in Figure 16 the friction clutch driving means 30 are eliminated and gear supporting member 266 is supported on bearing assembly 23 in close proximity to pump side wall member 267 with the edge thereof secured to ring gear 7 by cap screws 8 as in the form illustrated in Figure 1.

In this form of the invention a one piece casing 268 is provided which extends from fly wheel casing 79 to end cap member 269, the forward end of casing 268 being provided with a locating flange 271 secured to casing 79 by means of bolts or studs 272, the rear end of casing 268 being provided with a locating flange 273 for reception in an annular recess 274 in forwardly projecting flange member 275 of end cap member 269 secured to casing 268 by means of bolts or studs 276. A casting 277 corresponding to casting 52 in the first form of the invention is provided with a cylindrical outer surface 278 for reception within the inner cylindrical wall 279 of fluid storage and water chambers 281 and 282 corresponding to similar chambers 61 and 84 respectively in the first form of the invention. Casting 277 is provided with a flange 283 for engagement with a face 284 formed on casing 268 adjacent wall 279 and to which the flange 283 is detachably secured by means of bolts or studs 285.

By constructing casing 268 and casting 277 as above set forth the parts can be more easily assembled and dis-assembled and furthermore the cost of production can be considerably decreased as the parts can be made of different materials in which event also a lighter construction can be provided. For example casing 268 may be constructed of aluminum while casting 277 may be constructed of bronze. Casing 268 is provided with a removable inspection cap 286.

In this form of the invention the packing rings 143 carried by member 141 and engaging casting 136 as in the first form of the invention are eliminated since diaphragm 287 has the round edges 288 thereof seated in and secured by welding in corresponding recesses in casting 290 thus positively preventing escape of fluid. Diaphragm 287 is formed with a plurality of concentric folds or corrugations 289 the outwardly opening central one of which engages a rounded circular rib 291 on the outer edge of flange 292 of bearing cage 141. By this construction the pressure against diaphragm 287 will be substantially equal on opposite sides of its engagement with flange 292 giving greater effectiveness and a centralizing and equalizing effect on the bearing cage.

It will be noted that in this form of the invention the valve and motor parts are substantially spaced from casing 268 and a port 294 is provided in communication with chamber 64 and the space within casing 268 thus providing for an unrestricted circulation of operating fluid therethrough to and from the automobile engine.

In this form of the invention the valve plate shifting mechanism is located on the side of casing instead of on the top as is indicated in Figure 17 wherein a casing 295 is formed on the side of casing 268 in which gears 296 and 297 are rotatably journaled and which mesh with gear teeth 298 formed on valve plates 102 and 103 respectively. Secured to the respective stub shafts 299 and 301 of gears 296 and 297 are cranks 302 and 303 to the outer ends of which suitable actuating rods 304 are pivotally secured by pins 305 which rods may be actuated by any suitable means.

The operation of this form of the invention is the same as that above set forth except for the changes involved in the enumerated modified mechanisms the operation of which will be obvious from the foregoing disclosure.

Having described preferred embodiments only of the invention, it will be obvious to those skilled in the art that numerous variations may be made in the arrangement of the various combinations and details hereinbefore disclosed, and the various sub-combinations and principles are applicable to a wide range of independent uses without departing from the spirit of my invention, as defined by the scope of the appended claims.

Accordingly, what is desired to be secured by Letters Patent and claimed as new is:—

1. A hydraulic torque multiplying transmission comprising a driving member; a driven member; a set of coacting rotary pumping elements actuated by said driving member and by said driven member respectively; a rotary hydraulic motor substantially aligned with said pump and actuated by fluid delivered thereto by the difference in rotation of said driving and said driven members, said motor being designed to drive said driven member; and fluid distributing means provided with high and low pressure fluid passages interposed between said pump elements and said motor said means including stationary annular high and low pressure fluid storage spaces intersected by said passages.

2. The combination set forth in claim 1, said pumping elements being in nested relationship and there being means carried by the outer one of said pump elements for direct driving engagement thereof with said driving member.

3. A hydraulic torque multiplying transmission comprising a driving member; a driven member; coacting rotary pump elements actuated by said driving member and by said driven member; a rotary hydraulic motor actuated by fluid delivered thereto by the difference in rotation of said driving and said driven members, said motor being designed to drive said driven member; fluid distributing means interposed between said pump elements and said motor; and means adjacent said motor actuated by fluid pressures developed by said pump elements for holding said pump parts in fluid sealing relation to each other and said fluid receiving and distributing means.

4. In a hydraulic transmission a driving shaft, a driven shaft; a pump operated by the difference of rotation of said driving and said driven shafts; a motor actuated by fluid delivered thereto by said pump and in driving engagement with said driven shaft; fluid distributing valve parts interposed between said motor and said pump; a radial and thrust bearing structure secured against longitudinal movement on said driven shaft and set within one of said valve parts; and pressure operated means adjacent said motor for holding said valve parts in fluid sealing relationship.

5. A hydraulic transmission comprising a shaft; a pump and driving means therefor, said pump comprising a side wall member provided with a quill member slidably mounted on said shaft; an eccentric carried by said quill member; a roller bearing assembly on said eccentric; a pinion journaled on said bearing assembly; a ring gear meshing with said pinion; and a ring gear supporting member connected to said ring gear and journaled on a roller bearing assembly mounted on an extension of said side wall member; a motor for driving said shaft; and means for distributing fluid between said pump and said motor.

6. A hydraulic transmission comprising a rotary pump; a rotary motor; fluid distributing means between said pump and said motor; and means carried by said motor and responsive to developed fluid pressures for holding said pump and said motor in fluid sealing engagement with said fluid distributing means.

7. A hydraulic transmission comprising a driving member; a driven member; a pump actuated by the difference in rotation of said driving and said driven member; a motor actuating said driven member; means for distributing fluid between said pump and said motor; and speed controlled means centrifugally operable in response to speeds of said driven member for driving said driven member independently of said motor.

8. In a hydraulic transmission, a driving member; a driven member; a fluid pump driven by said driving member; a fluid motor driving said driven member; fluid operated means for automatically varying the volumetric capacity of said motor in response to variations in load on the driven member; fluid actuated means for holding said motor and pump parts in fluid sealing relationship; and common means controlling admission of fluid to said first and said second mentioned means.

9. In combination with the oil reservoir of the liquid lubrication system of a prime mover, a hydraulic transmission apparatus comprising a fluid pump and a fluid motor interconnected by fluid distributing paths, a casing housing said pump and motor, and an oil well in the upper side of said casing in communication with one of said fluid paths and having an overflow into said casing; a replenishment line connecting the upper side of said oil reservoir with said well; and a line connecting the bottom of said casing with the lower side of said oil reservoir to return leakage and overflow liquid from the former to the latter.

10. In a hydraulic transmission, a driving member; a driven member; a pump actuated by said driving member; a motor for operating said driven member; means for providing a fluid belt between said pump and said motor; and means actuated by said driven member and centrifugally responsive to predetermined rotative speeds of the latter to mechanically couple said driving and driven members, whereby a decreased amount of power is transmitted through said fluid belt.

11. In a hydraulic transmission, a driving member; a driven member; a pump actuated by said driving member; a motor for operating said driven member, means providing a fluid belt between said pump and said motor, and a friction clutch for mechanically intercoupling said driving and driven members at predetermined rotational speeds; said clutch comprising an annular device carried by said driving member and a second annular device carried by said driven member, said devices being closely and radially arranged relative to one another, one of them being radially movable in response to varying centrifugal forces to couple or uncouple the devices.

12. In a hydraulic transmission, a driving member; a driven shaft; a pump at the power input end of said transmission and actuated by said driving member; a motor substantially aligned with said pump and driving said driven shaft; valving means between said pump and said motor to provide a fluid belt therebetween, and a balancing device for sealing the transmission against fluid leakage, said device comprising means providing a stationary expansible chamber adjacent said motor at the power output end of the transmission, and means for subjecting said chamber to pressures to force said motor towards the pump and valving means.

13. In a hydraulic transmission, a driving member and a fluid pump actuated thereby; a driven shaft extending at its forward end through said pump and designed to limit movement of the pump in a forward direction relative to said shaft; a motor aligned with said pump and in driving engagement with the rear end of said shaft; valving means for distributing fluid between said pump and said motor; and a balancing mechanism for sealing the transmission against fluid leakage, said mechanism comprising a reactance member surrounding said shaft and having its rearward movement limited relative to said shaft, and means forwardly of and cooperating with said member to form an expansible fluid pressure chamber, whereby said motor is thrust towards said pump by fluid pressures during operation of the transmission.

14. In a hydraulic transmission, in combination, a driving shaft, and a driven shaft; a fluid pump actuated by said driving shaft, and a fluid motor for actuating said driven shaft; means for distributing fluid between said pump and said motor to drive the latter from the former; and automatic mechanism, wholly responsive to the speed of said driven shaft, to mechanically intercouple said shafts for unitary rotation when the driven shaft speed reaches a predetermined maximum value.

15. In a hydraulic transmission, in combination, a driving shaft, and a driven shaft; a fluid pump actuated by said driving shaft, and a fluid motor for actuating said driven shaft; means for distributing fluid between said pump and said motor to drive the latter from the former; and an automatically operable device responsive to relatively high speeds of said driven shaft to frictionally intercouple said driving and driven shafts.

16. In the combination defined in claim 15, said device being designed to gradually intercouple said shafts, and thus to gradually by-pass more and more of the transmitted power around the motor as the speed of said driven shaft increases toward a maximum.

17. In a hydraulic transmission apparatus, a driving member and a driven member; a rotary pump comprising a pair of eccentrically nested elements connected respectively to said shafts to rotate therewith, and an expansible sealing segment fitted between said elements to provide pump pressure and discharge chambers; a fluid motor for driving said driven member; means for distributing fluid between said pump chambers and said motor; and means responsive to increasing fluid pressure during operation of the transmission to expand said segment into efficient sealing engagement with said nested pump elements.

In testimony whereof I affix my signature.

ALDEN G. RAYBURN.